Nov. 10, 1959 E. C. DISTLER 2,911,681
CONTAINERS AND METHODS OF MAKING THEM
Filed July 19, 1956

United States Patent Office 2,911,681
Patented Nov. 10, 1959

2,911,681

CONTAINERS AND METHODS OF MAKING THEM

Edward C. Distler, Rydal, Pa., assignor, by mesne assignments, to Jennings Machine Corporation, Philadelphia, Pa., a corporation of Pennsylvania Application July 19, 1956, Serial No. 598,934

3 Claims. (Cl. 18—56)

This invention relates to formation of self-supporting containers and like articles from polyester film.

In accordance with the invention, the polyester film is heated to a critical temperature within a narrow range hereinafter specified, and while at such temperature and clamped over the opening of a forming die, it is rapidly drawn to container shape by a draping die forced at high pressure into the forming die. The dies remain in engagement with the container so formed until the film is substantially below the aforesaid critical temperature. The formed container may be stripped from the draping die by compressed air forced into it through the draping die.

The invention further resides in polyester containers and methods of making them having the features of novelty and utility hereinafter described.

For a more detailed understanding of the invention, reference is made in the following description to the attached drawings in which.

The toughness, durability and non-porosity of Mylar film, a polyester film produced from a polymer of ethylene glycol and terephthalic acid, have been previously recognized as suiting it for possible use, in under-1-mil gages, as window material in cartons, as wrapping material, or a material from which flexible bags made be made. The present invention is concerned with the formation from thicker gages of such film (up to 10 mils or more) of self-supporting rigid containers.

Figure 1:
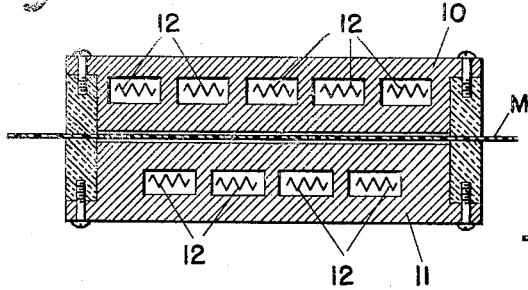
Fig. 1 is a sectional view of the film and heating means therfor.

The area of film to be formed into a container body is heated to critical drawing temperature close to or preferably within the optimum range of about 410° to 415° F., which is substantially below its melting and heat-sealing temperature of 490° F. As shown in Fig. 1, the Mylar film M may be held between a pair of heated plates or blocks 10, 11 each having embedded therein or secured thereto one or more suitable electrical heater units 12 which may be thermostatically controlled to maintain the required temperature of the blocks. Any other suitable arrangement for heating the film to the required temperature may be used.

Figure 2:
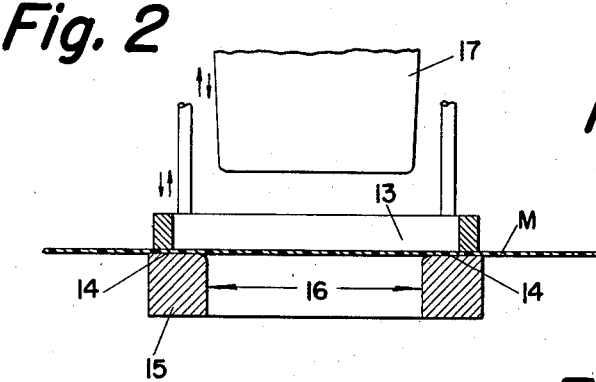
Fig. 2 is a fragmentary view showing the film clamped in readiness for forming by closure of die means.

While the Mylar film is at critical temperature, it is firmly clamped at high pressure against the face 14 of die-block 15 (Fig. 2). The opening 16 of the female die 15 is shaped and dimensioned to correspond with those of the top of the container body to be formed. The internal periphery of the clamping frame 13 is so shaped and dimensioned that it is spaced throughout from the upper edge of the die recess 16 to leave an unclamped film area bounding the die opening and the flat film extending across that opening.

Figure 3:
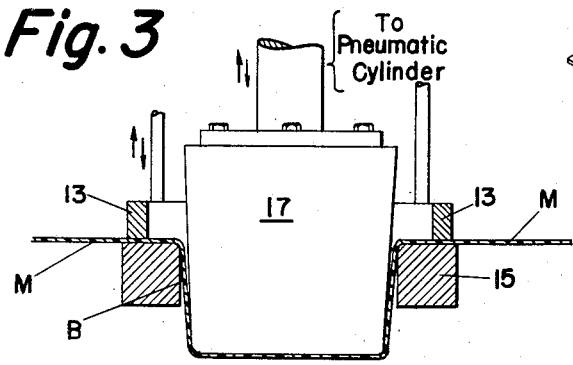
Fig. 3 shows the dies of Fig. 2 in closed position.

Immediately after clamping of the film, a male draping die 17 is forced at high pressure (generally in the range of 800 to 1300 pounds per square inch of film-contact) against the heated film and then rapidly through the die opening 16 to form the container body B (Fig. 3). The stroke of the draping die is preset to obtain the desired depth of the container body. In continuous movement of the draping die from the open position of Fig. 2 to the closed position of Fig. 3, the average speed of the die is generally in the range of about 3 to 12 inches per second. The draping die is preferably coupled to the piston of a pneumatic cylinder for the required high speed, high pressure operation.

The external perimeter of the lower face of the draping die corresponds in shape with that of the die opening 16 but is of slightly smaller dimensions to leave a gap which is slightly greater than the original film thickness. The draping die may be slightly tapered but not to such extent that the film is squeezed between the sides of the dies. The lower edge of the draping die and the upper edge of the die recess are slightly rounded.

As the draping die descends to the closed position, the heated polyester film is drawn over the edges of the dies, its area increasing and its thickness decreasing as it is stretched by the descending die 17. With the film heated to the aforesaid critical temperature and rapidly drawn at high pressure, the film material flows or stretches smoothly and evenly without rupture or excessive variations in thickness of the formed container body.

The die members 15, 17 are maintained in their closed position until the temperature of the film falls far below its critical drawing temperature and so sets in its formed state with no tendency to return to its original flat state upon retraction of the draping die. The time required for cooling of the film is short because of the high thermal conductivity of the metal die members and their large area of contact with the film. The stored heat of the film is small so that even when containers are formed in quick succession, for example at the rate of 60 per minute, the temperature of the dies does not rise very much above ambient room temperature even without forced cooling by air or liquid coolant.

Figure 4:
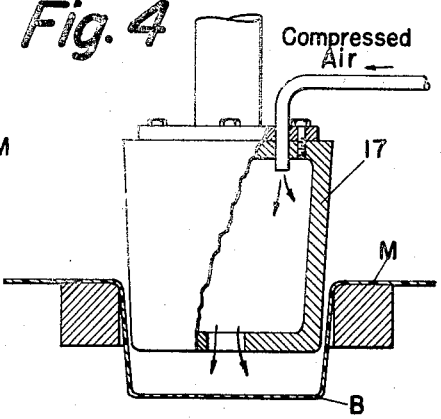
Fig. 4 illustrates stripping of the formed container.
Figure 5:
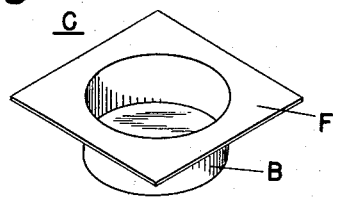
Figs. 5 to 7 are perspective views of typical containers.

Deep drawn containers with straight sides, such as shown in Fig. 5 for example, have a strong tendency tightly to cling to the draping die. They can be quickly stripped therefrom without injury to the container by forcing air into it through the draping die which, as shown in Fig. 4, may be made hollow.

With cylindrical dies, the formed container C is generally as shown in Fig. 5. By way of specific example, the foregoing method has successfully produced self-supporting cylindrical container bodies B having a depth of 1¼ inches and a diameter of 2⅛ inches and from a 4 x 4 inch area of 10 mil Mylar film; a depth of 1⅝ inches and a diameter of 2⅛ inches from a 4 x 5 inch area of 10 mil Mylar film; and a depth of 2 inches and a diameter of 2 inches from a 4 x 5 inch area of 8 mil Mylar film.

Figure 6:
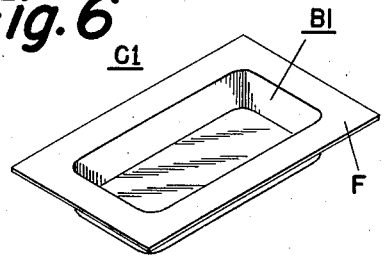

With the rectangular dies, the formed container C1 is generally of the appearance shown in Fig. 6. Again by way of example, the foregoing method has been used successfully to produce rectangular self-supporting container bodies B1 having a depth of ¾ inch, a width of 2½ inches and a length of 3⅝ inches from a 4 x 5 sheet of 5 mil Mylar film.

Figure 7:
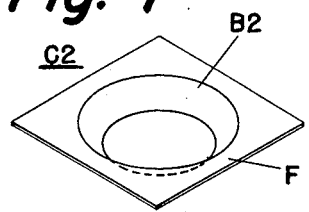

With tapered dies of circular cross section, the formed container C2 is generally of the appearance shown in Fig. 7. Again by way of example, the foregoing method has been successfully used to produce self-supporting container bodies B2 having a depth of 9/16 inch, a bottom diameter of 1⅜ inch and a top diameter of 2⅛ inches from a 4 inch square area of 5 mil Mylar film. For containers of this shape, compressed air need not be used to strip them from the draping die.

In all of the containers so formed, any part or all of the flange F extending from the upper end of the container body may be cut away or the flange F may be retained depending upon the intended use of particular containers. The containers may be formed from individually precut sheets of Mylar film or may be detached after their formation from a continuous web of Mylar film or they may be detached from a sheet or length of webbing common to a group of containers concurrently formed by ganged pairs of dies. The heating of the film may be effected at the drawing station, at a station adjacent thereto, or during transport to the drawing station, but in all cases the temperature of the film when engaged by the rapidly moving draping dies should preferably be in the optimum range of 410° F. to 415° F. and the drawing pressure as applied to the area of the film across the die opening should be in the range of about 800 to 1300 pounds per square inch. If the film temperature is much below 410° F., the film is rigid and fractures during drawing whereas if the temperature is much above 415° F., the film is very soft and pulls apart during drawing. If the pressure per square inch on the film is too low (i.e., is much below 800 p.s.i.), the drawing rate becomes so slow that the film chills and prevents completion of the draw whereas if the pressure is too high (i.e., much above 1300 p.s.i), the rate of draw exceeds the flow capabilities of the film and it breaks.

What is claimed is:

1. A method of forming self-supporting containers from polyester film having a substantially uniform thickness in the range of 1 to 10 mils and produced from a polymer of ethylene glycol and terephthalic acid which comprises heating the film to a temperature in the range of about 410° F. to 415° F., clamping the heated film between an apertured plate and the opposed edge of a female die, forcing a male die at pressure in the range of about 800 to 1300 pounds per square inch of film contact against the unclamped area of the heated film to draw it over the edges of said dies and into the female die to form a container, and retaining the dies in engagement with the formed container until its temperature is substantially below said range.

2. A method as in claim 1 in which the male die is moved at the average rate of 3 to 12 inches per second during forming of the container.

3. A self-supporting container of polyester film produced from a polymer of ethylene glycol and terephthalic acid, having a substantially uniform wall thickness in the range of 1 to 10 mils and made by the process of claim 1.

References Cited in the file of this patent

UNITED STATES PATENTS

| | | |
|---|---|---|
| Re 23,171 | Borkland | Nov. 29, 1949 |
| 2,357,806 | Borkland | Sept. 12, 1944 |
| 2,444,420 | Borkland | July 6, 1948 |
| 2,468,697 | Wiley | Apr. 26, 1949 |
| 2,497,376 | Swallow et al. | Feb. 14, 1950 |